United States Patent
Suciu

(10) Patent No.: US 10,036,329 B2
(45) Date of Patent: Jul. 31, 2018

(54) GAS TURBINE ENGINE THERMAL MANAGEMENT SYSTEM FOR HEAT EXCHANGER USING BYPASS FLOW

(71) Applicant: United Technologies Corporation, Hartford, CT (US)

(72) Inventor: Gabriel L. Suciu, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 585 days.

(21) Appl. No.: 14/430,315

(22) PCT Filed: Mar. 12, 2013

(86) PCT No.: PCT/US2013/030375
§ 371 (c)(1),
(2) Date: Mar. 23, 2015

(87) PCT Pub. No.: WO2014/051678
PCT Pub. Date: Apr. 3, 2014

(65) Prior Publication Data
US 2015/0247462 A1  Sep. 3, 2015

Related U.S. Application Data

(60) Provisional application No. 61/706,878, filed on Sep. 28, 2012.

(51) Int. Cl.
*F02C 9/18* (2006.01)
*F02C 7/14* (2006.01)
(Continued)

(52) U.S. Cl.
CPC .............. *F02C 9/18* (2013.01); *F01D 17/105* (2013.01); *F02C 3/107* (2013.01); *F02C 6/08* (2013.01);
(Continued)

(58) Field of Classification Search
CPC .... F02C 9/18; F02C 7/18; F02C 3/107; F02C 6/08; F02C 7/14; F01D 17/105;
(Continued)

(56) References Cited

U.S. PATENT DOCUMENTS 4,081,958 A * 4/1978 Schelp ...................... F02C 7/14
431/170
4,254,618 A * 3/1981 Elovic ..................... F02C 7/185
60/226.1
(Continued)

FOREIGN PATENT DOCUMENTS

EP  0511770  11/1992
EP  2584172  4/2013
(Continued)

OTHER PUBLICATIONS

International Search Report and Written Opinion for PCT/US2013/030375 dated Jun. 27, 2013.
(Continued)

*Primary Examiner* — Eldon Brockman
(74) *Attorney, Agent, or Firm* — Carlson, Gaskey & Olds, P.C.

(57) ABSTRACT

A gas turbine engine has a fan nacelle and a core nacelle arranged to provide a bypass flow path. A compressor section is provided within the core nacelle. A heat exchanger is arranged within a duct. The heat exchanger is configured to receive bypass flow from the bypass flow path. The duct is in fluid communication with the compressor section and is configured to pass bleed air through the heat exchanger.

11 Claims, 2 Drawing Sheets

(51) Int. Cl.
    *F02K 3/115*     (2006.01)
    *F02C 6/08*     (2006.01)
    *F02C 3/107*     (2006.01)
    *F02C 7/18*     (2006.01)
    *F01D 17/10*     (2006.01)
    *F02K 3/04*     (2006.01)
    *F02K 3/075*     (2006.01)

(52) U.S. Cl.
    CPC ............... *F02C 7/14* (2013.01); *F02C 7/18* (2013.01); *F02K 3/04* (2013.01); *F02K 3/075* (2013.01); *F02K 3/115* (2013.01); *F05D 2260/213* (2013.01); *F05D 2270/3062* (2013.01); *Y02T 50/676* (2013.01)

(58) Field of Classification Search
    CPC . F02K 3/04; F02K 3/075; F02K 3/115; F05D 2260/213; F05D 2270/3062
    See application file for complete search history.

(56) References Cited

U.S. PATENT DOCUMENTS

| | | | | |
|---|---|---|---|---|
| 4,503,666 | A * | 3/1985 | Christoff | B64D 13/06 60/39.183 |
| 4,608,819 | A | 9/1986 | Colman et al. | |
| 4,773,212 | A * | 9/1988 | Griffin | F02C 7/224 60/226.1 |
| 5,269,135 | A * | 12/1993 | Vermejan | F02C 7/04 60/226.1 |
| 6,931,834 | B2 * | 8/2005 | Jones | F28D 15/02 257/E23.088 |
| 7,454,894 | B2 * | 11/2008 | Larkin | F01D 25/12 60/226.1 |
| 7,607,308 | B2 | 10/2009 | Kraft et al. | |
| 7,716,913 | B2 | 5/2010 | Rolt | |
| 7,856,824 | B2 | 12/2010 | Anderson et al. | |
| 8,161,755 | B2 | 4/2012 | Marche | |
| 8,266,888 | B2 | 9/2012 | Liu | |
| 8,966,875 | B2 * | 3/2015 | Suciu | F02C 7/32 184/6.11 |
| 8,978,351 | B2 * | 3/2015 | Suciu | F02C 7/08 184/6.11 |
| 9,080,511 | B2 * | 7/2015 | Suciu | F02C 7/08 |
| 9,200,569 | B2 * | 12/2015 | Suciu | F02C 7/08 |
| 2006/0117734 | A1 | 6/2006 | Larkin et al. | |
| 2006/0162371 | A1 | 7/2006 | Lui et al. | |
| 2012/0112575 | A1 | 5/2012 | Blewett et al. | |
| 2012/0114468 | A1 | 5/2012 | Elder | |
| 2013/0097992 | A1 * | 4/2013 | Suciu | F02C 7/08 60/39.83 |
| 2013/0098046 | A1 * | 4/2013 | Suciu | F02C 7/08 60/772 |
| 2013/0098047 | A1 * | 4/2013 | Suciu | F02C 7/08 60/772 |
| 2013/0098057 | A1 * | 4/2013 | Suciu | F02C 9/16 60/779 |
| 2013/0098059 | A1 * | 4/2013 | Suciu | F02C 9/16 60/783 |

FOREIGN PATENT DOCUMENTS

| | | |
|---|---|---|
| FR | 2955896 | 8/2011 |
| WO | 9211451 | 7/1992 |

OTHER PUBLICATIONS

International Preliminary Report on Patentability for PCT/US2013/030375 dated Apr. 9, 2015.
Extended European Search Report for European Application No. 13842461.8, dated Apr. 25, 2016.

* cited by examiner

GAS TURBINE ENGINE THERMAL MANAGEMENT SYSTEM FOR HEAT EXCHANGER USING BYPASS FLOW

This application is a United States National Phase of PCT Application No. PCT/US2013/030375 filed on Mar. 12, 2013 which claims priority to U.S. Provisional Application No. 61/706,878, filed on Sep. 28, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines. One type of gas turbine engine uses a geared architecture between the turbine section and the fan section.

Airflow generated by the fan section is routed through a bypass flow path arranged radially between core and fan nacelles. An engine heat exchanger is commonly exposed to flow from the bypass flow path to take advantage of the relatively cool high speed airflow. Cooling with the propulsive fan works well for high speed fans, however geared architectures provide for slower more efficient fan speeds. The reduced airflow and pressure through the bypass passage can degrade performance of a heat exchanger that relies on the bypass airflow for cooling.

The heat exchanger is used to cool a fluid in a gas turbine engine system, such as lubrication oil. If there is insufficient differential pressure across the heat exchanger, such as during situations in which the aircraft is parked, insufficient flow may be provided across the heat exchanger. As a result, the fluid may get hotter than desired.

SUMMARY

In one exemplary embodiment, a gas turbine engine has a fan nacelle and a core nacelle arranged to provide a bypass flow path. A compressor section is provided within the core nacelle. A heat exchanger is arranged within a duct. The heat exchanger is configured to receive bypass flow from the bypass flow path. The duct is in fluid communication with the compressor section and is configured to pass bleed air through the heat exchanger.

In a further embodiment of the above, the heat exchanger is arranged within the core nacelle.

In a further embodiment of any of the above, the compressor section includes a low pressure compressor and a high pressure compressor. The duct is in fluid communication with a region between the low pressure compressor and the high pressure compressor.

In a further embodiment of any of the above, the gas turbine engine includes only two spools. The low pressure compressor is arranged on a first spool, and a high pressure compressor is arranged on a second spool.

In a further embodiment of any of the above, a bleed air valve is arranged within the duct to selectively communicate fluid from the compressor section to the heat exchanger.

In a further embodiment of any of the above, a controller is in communication with the bleed air valve. The controller is configured to open the bleed air valve during undesired bypass flow rates through the heat exchanger.

In a further embodiment of any of the above, the undesired bypass flow rates are provided at an aircraft park condition.

In a further embodiment of any of the above, the controller is configured to close the bleed air valve at aircraft cruise conditions.

In a further embodiment of any of the above, a system is in fluid communication with the heat exchanger. The system includes oil.

In a further embodiment of any of the above, a fan is arranged within the duct and is configured to selectively increase a pressure differential across the heat exchanger.

In a further embodiment of any of the above, the fan is actuated at undesired bypass flow rates through the heat exchanger.

In a further embodiment of any of the above, the undesired bypass flow rates correspond to an aircraft park condition.

In a further embodiment of any of the above, the fan is an electric fan. A controller communicates with the fan to regulate the fan in response to inputs.

In a further embodiment of any of the above, the inputs that correspond to conditions indicative of an aircraft part condition.

In a further embodiment of any of the above, the inputs are indicative of an undesired differential pressure across the heat exchanger.

In another exemplary embodiment, a method of providing cooling fluid to a heat exchanger includes supplementing a bypass flow across a heat exchanger with the bleed air from a compressor section.

In a further embodiment of any of the above, the supplementing step includes selectively regulating the flow with a bleed air control valve.

In a further embodiment of any of the above, a fan is in communication with a duct, including the step of additionally supplementing the bypass flow with the fan.

In another exemplary embodiment, a method of cooling a heat exchanger includes selectively controlling a fan to regulate a cooling fluid across a heat exchanger. The fan is separately operable from a turbofan and compressor section.

BRIEF DESCRIPTION OF THE DRAWINGS

The disclosure can be further understood by reference to the following detailed description when considered in connection with the accompanying drawings wherein.

DETAILED DESCRIPTION

Figure 1:
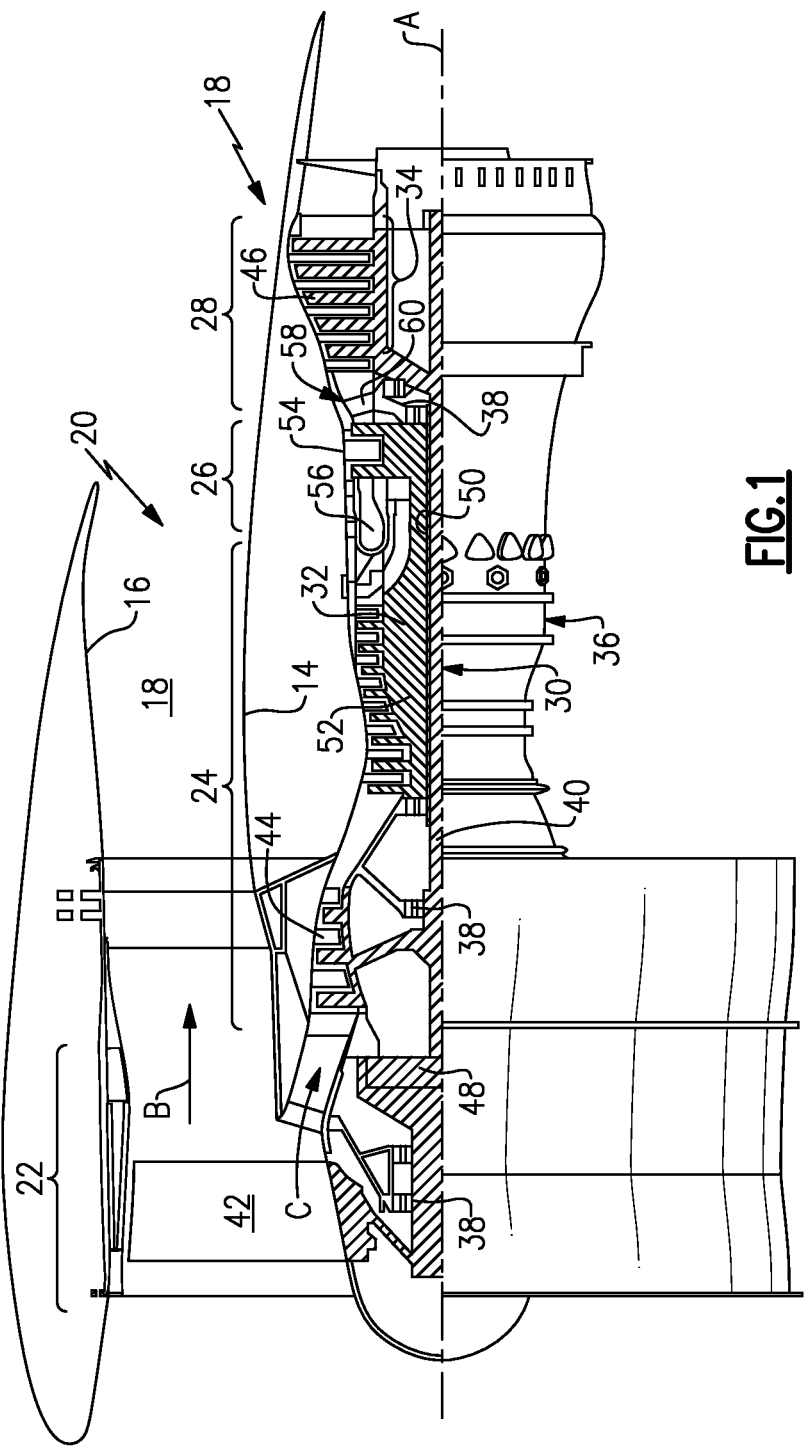
FIG. 1 is a schematic view of an example gas turbine engine incorporating the disclosed thermal management system.

FIG. 1 schematically illustrates an example gas turbine engine 20 that includes a fan section 22, a compressor section 24, a combustor section 26 and a turbine section 28. Alternative engines might include an augmenter section (not shown) among other systems or features.

The fan section 22, or turbofan, drives a bypass flow B along a bypass flow path 18 while the compressor section 24 draws air in along a core flow path C where air is compressed and communicated to a combustor section 26. The bypass flow path 18 is provided radially between core and fan nacelles 14, 16.

In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
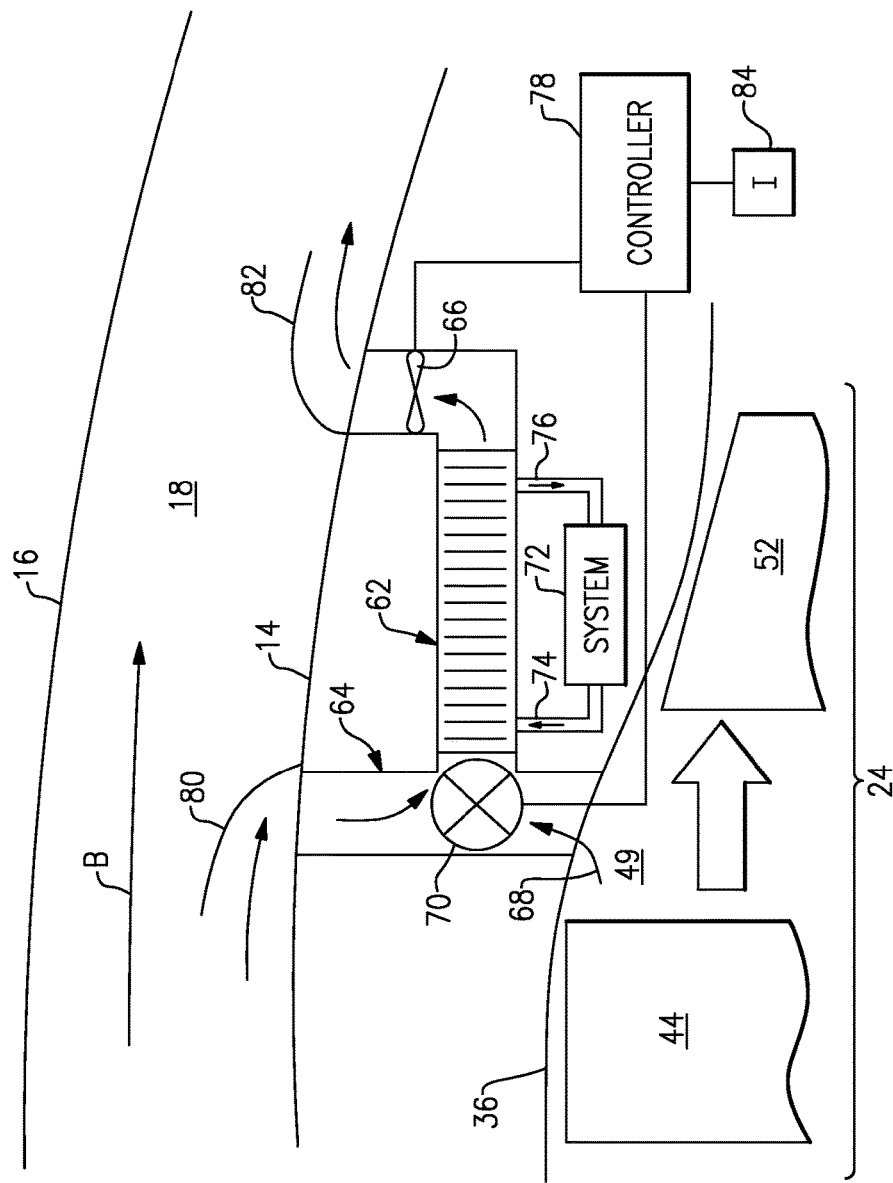
FIG. 2 schematically illustrates the heat exchanger within the gas turbine engine as illustrated in FIG. 1.

In one example, a heat exchanger 62 is arranged within the core nacelle 14, as shown in FIG. 2. A duct 64 is provided within the core nacelle 14 to fluidly communicate one or more cooling fluids through the heat exchanger 62. In the example, an inlet scoop 80 may be provided within the bypass flow path 18 to direct bypass flow B within the bypass flow passage 18 into the duct 64. The bypass flow through the duct 64 passes through the heat exchanger 62 and exits an exhaust 82 arranged within the bypass flow passage 18.

In the disclosed example, the fan 42 rotates at a slower more efficient speed due to the geared architecture 48. The slower fan speed can result in lower pressures and air velocities within the bypass passaged 18 and thereby over the heat exchanger 62. Reduced air pressure and velocities can degrade the heat exchange efficiency of the heat exchanger 62.

The duct 64 is also arranged to receive bleed air from the compressor section 24. In the disclosed gas turbine engine 20, the duct 64 draws bleed air 68 from the compressor section 24. In the example, duct 64 can draw air from either the low pressure compressor 44 and/or the high pressure compressor 52, or a combination of both the low pressure compressor 44 and the high pressure compressor 52. The bleed air 68 from the compressor section 24 is used to provide additional cooling air pressure and flow across the heat exchanger 62. In the example, the duct 64 is in fluid communication with a region 49 located axially between the low pressure compressor 44 and the high pressure compressor 52, which may commonly be referred to as "station 2.5 bleed." The example compressor is fabricated and built to accommodate the extra bleed air draw in order to prevent any effect on compressor operability.

A bleed air valve 70 may be arranged in the duct 64 to selectively regulate bleed air flow from the region 49 to the heat exchanger 62. In the example, the bleed air valve 70 is a two-way valve that bleed air flow 68 and/or bypass flow B through the heat exchanger 62.

A system 72, such as a lubrication system, communicates a fluid, such as oil, through an outlet 74 into the heat exchanger 62 to be cooled. The fluid is then received back into the system 72 from an inlet 76 at a lower temperature after rejecting heat to the airflow through the duct 64.

A controller 78 communicates with the bleed air valve 70 and one or more inputs 84, which may provide information relating to various operational states of the gas turbine engine 20 and/or the aircraft. If the controller 78 detects undesired bypass flow rates through the heat exchanger 62, then the controller will open the bleed air valve 70 to permit bleed air from the region 49 to flow through the heat exchanger 62 and supplement the bypass flow from the bypass flow path 18. The controller 78 closes the bleed air valve 70 during high bypass flow conditions, such as cruise, since sufficient airflow is provided through the duct.

Even with the additional bleed air flowing through the heat exchanger 62, an insufficient differential pressure may exist across the heat exchanger 62 to achieve desired airflow though the duct and cooling of the system fluid. To this end, an electric fan 66 may provide in the duct 64 to selectively increase the differential pressure across the heat exchanger 62. The electric fan 62 can be controlled to supplement air flow and pressure in conditions where the engine is not producing sufficient airflow and pressure to operate the heat exchanger efficiently. The additional electric fan 66 increases air pressure across the heat exchanger 62.

The fan 66 may be located as desired, and, in the example, the fan 66 is located downstream from the heat exchanger 62 to pull the fluid through the heat exchanger 62. The controller 78 communicates with the fan 66 to turn the fan on and off as needed. In one example, the fan 66 is turned on during low flow conditions, for example, when the aircraft is parked and the gas turbine engine is idling. The fan 66 is turned off during high flow conditions, for example, during cruise when sufficient bypass flow passes through the duct 64.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
    a fan nacelle and a core nacelle arranged to provide a bypass flow path;
    a compressor section provide within the core nacelle;
    a heat exchanger arranged within a duct that is configured to receive bypass flow from the bypass flow path, the duct in fluid communication with the compressor section and configured to pass bleed air through the heat exchanger;
    a fan arranged within the duct and configured to selectively increase a pressure differential across the heat exchanger;
    a two way bleed air valve arranged within the duct to selectively communicate fluid from the compressor section and bypass flow to the heat exchanger; and
    a controller in communication with the two way bleed air valve, the controller configured to open the two way bleed air valve during undesired bypass flow rates through the heat exchanger, wherein the undesired bypass flow rates are provided at an aircraft park condition and the gas turbine engine is idling.

2. The gas turbine engine according to claim 1, wherein the heat exchanger is arranged within the core nacelle.

3. The gas turbine engine according to claim 1, wherein the compressor section includes a low pressure compressor and a high pressure compressor, and the duct is in fluid communication with a region between the low pressure compressor and the high pressure compressor.

4. The gas turbine engine according to claim 3, wherein the gas turbine engine includes only two spools, the low pressure compressor arranged on a first spool, and a high pressure compressor arranged on a second spool.

5. The gas turbine engine according to claim 1, wherein the controller is configured to close the two way bleed air valve at aircraft cruise conditions.

6. The gas turbine engine according to claim 1, comprising a system in fluid communication with the heat exchanger, wherein the system includes oil.

7. The gas turbine engine according to claim 1, wherein the fan is actuated at undesired bypass flow rates through the heat exchanger.

8. The gas turbine engine according to claim 7, wherein the undesired bypass flow rates correspond to an aircraft park condition.

9. The gas turbine engine according to claim 1, wherein the fan is an electric fan, and the controller communicates with the fan to regulate the fan in response to inputs.

10. The gas turbine engine according to claim 9, wherein the inputs correspond to conditions indicative of an aircraft park condition.

11. The gas turbine engine according to claim 9, wherein the inputs are indicative of an undesired differential pressure across the heat exchanger.

* * * * *